July 26, 1927.

W. H. PRATT 1,637,049

ELECTRIC METER

Filed Dec. 17, 1926

Inventor:
William H. Pratt,
by *Alexander S. [signature]*
His Attorney.

Patented July 26, 1927.

1,637,049

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

Application filed December 17, 1926. Serial No. 155,498.

My invention relates to alternating current electric meters of the integrating type and in particular to means for compensating such meters for changes in frequency.

It is known that the voltage electromagnet of an induction type watthour meter produces a certain amount of damping upon the rotating disc armature and that in some applications the strength of the voltage electromagnet may be increased to supply all of the damping flux of the meter so that the permanent magnet usually used for this purpose may be omitted. Such a meter is described in copending application Serial No. 121,890, filed July 12, 1926, Isaac F. Kinnard and William H. Pratt. It has been found that such meters have frequency errors due chiefly to variations in damping when used on circuits where the frequency varies to any appreciable extent and it is the object of my invention to compensate such meters for this source of error.

In carrying my invention into effect I prefer to divide the meter damping force between two electromagnets and provide a resonant circuit for energizing one of these electromagnets so that when the frequency varies the magnitude of the total meter damping remains substantially unchanged. The invention will be described hereinafter as applied to an integrating conductance meter for measuring flow.

The features of my invention which are believed to be novel and patentable will be pointed out in the claims appended hereto. For a better understanding of my invention reference is made in the following description to the accompanying drawing in which Fig. 1 shows the invention as applied to an integrating flow meter and Fig. 2 shows a resonance curve which will be referred to in explaining the invention.

Figure 1:
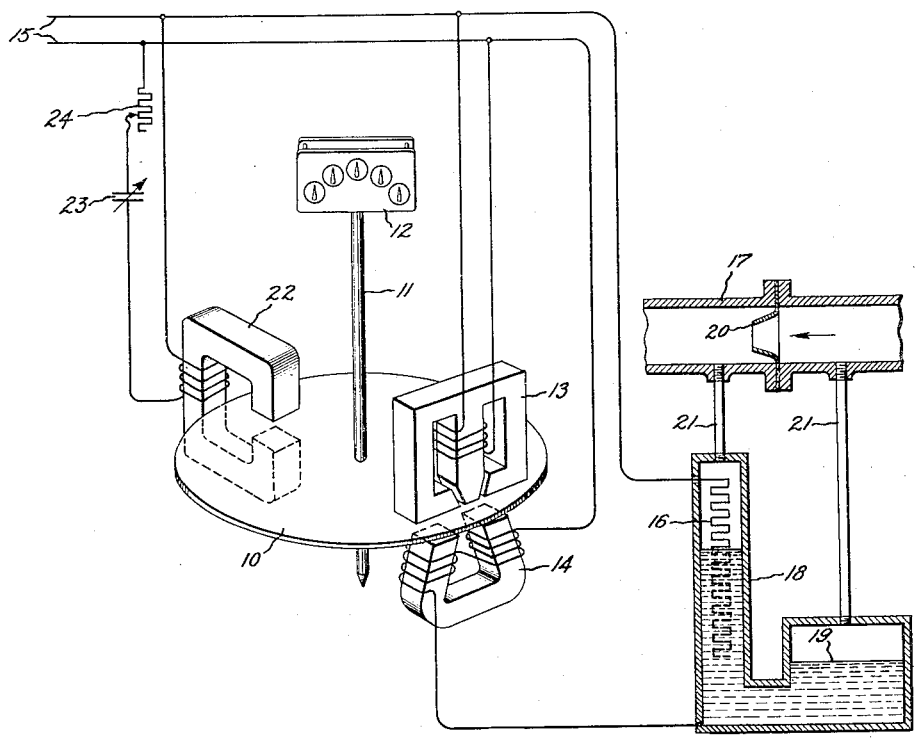
Figure 2:
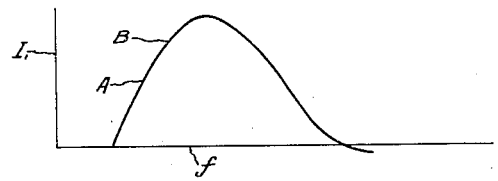

Referring to Fig. 1, 10 represents the rotatively mounted disc armature of conducting material. The armature is connected through its shaft 11 to the register at 12. The armature is inductively driven by a conductance measuring element comprising the voltage electromagnet 13 and the current electromagnet 14. The voltage electromagnet is connected across the source 15 and the current electromagnet is energized from this source through a variable impedance represented at 16. The impedance 16 is varied in accordance with the rate of flow of a fluid in conduit 17 and the particular arrangement here shown for this purpose comprises a U-shaped vessel 18 containing a conducting liquid 19 such as mercury arranged to have the mercury lever varied to short circuit more or less of the impedance 16 in accordance with the pressure difference created on the opposite sides of a nozzle 20 in the conduit 17. The pressure on opposite sides of this nozzle is conveyed to the surface of the mercury in the two legs of the vessel 18 by pipes 21 so that as the flow increases the pressure difference will cause the mercury to rise around the impedance 16 and decrease the impedance of the circuit which energizes the current electromagnet 14. This increases the current in this circuit and causes the meter torque to vary in accordance with the rate of flow.

In accordance with my invention the voltage electromagnet 13 supplies the torque component of the voltage flux and a considerable portion of the damping flux. The remainder of the damping flux is supplied by an electromagnet 22 having its energizing winding connected across source 15 through a condenser 23. The condenser may be adjustable and an adjustable resistance 24 may be included in this circuit for initial adjustment purposes.

If we represent the voltage of source 15 by E and the current through the impedance device 16 by I, the driving force or torque of the meter will be proportional to EI. However, since the current I will vary as the voltage varies, I will be proportional to the conductance C of device 16 times the voltage E. Thus I=EC or the torque is proportional $E^2C$. The damping force at a given frequency is proportional to the square of the damping flux or proportional to $E^2$ so that the speed of the meter at any given frequency is proportional to $\frac{E^2C}{E^2} = C$. The meter is therefore independent of voltage variations. The impedance of the circuit of electromagnet 14 is largely resistance and the current therein will be little influenced by changes in frequency; at least, it will not be influenced to the same extent that the current in the highly reactive circuit of the voltage electromagnet 13 is influenced by changes in frequency.

A decrease in frequency will increase the voltage flux of electromagnet 13 to a greater extent than it will the current flux giving rise to an increased damping which is not offset by a corresponding increase in the torque. It thus becomes desirable to compensate the meter for variations in frequency if used on a source of supply subject to such variations.

This is accomplished by my invention by supplying a proper proportion of the damping flux by the electromagnet 22 and tuning its energizing circuit so that it will operate on the ascending slope of its resonance curve over the variable frequency range. In Fig. 2 I have represented the resonance curve of the circuit of electromagnet 22, I being the current in the circuit for variations in frequency $f$. The resistance and capacity in this circuit is adjusted so that it operates over a range such as A B corresponding to the range of frequency variation of the source 15. It is therefore apparent that the amount of damping supplied by electromagnet 22 will increase and decrease as the frequency increases and decreases respectively.

Then, to make the operation of the meter independent of frequency variations, it is only necessary to proportion the meter damping between the two electromagnets 13 and 22 so that the increase in the ratio of damping force to driving torque of the meter elements 13, 14 due to a given decrease in frequency is offset by a corresponding decrease in damping at 22 and vice versa.

The proportion of damping supplied by the drag electromagnet 22 will vary somewhat with different installations since some installations will require greater frequency compensation than others due to different reactance characteristics of the meter circuits. For the average installation on a 60 cycle circuit the element 22 will supply approximately 1/3 of the meter damping at normal frequency.

In accordance with provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. An integrating meter of the induction type in which the damping force is supplied by electromagnetic means energized from an alternating current supply and means for automatically controlling the damping force thus supplied in response to changes in frequency for compensating the meter for frequency errors.

2. An integrating meter of the induction type in which the damping force is supplied by electromagnetic means energized from an alternating current supply, a portion of the damping force being supplied through a resonant circuit for the purpose of compensating said meter for errors due to variations in frequency.

3. An integrating conductance meter of the induction type in which the damping force and the driving force are supplied by electromagnetic means energized from the same source of alternating current supply, a portion of the damping force being supplied through a resonant circuit adjusted to operate on the ascending slope of its resonance curve for the purpose of compensating said meter for errors due to variations in frequency.

4. An integrating conductance meter of the induction type having a rotatively mounted armature, a voltage electromagnet and a current electromagnet which cooperates to drive said armature, said voltage electromagnet supplying a portion of the damping force of said meter, a common source of alternating current for supplying said electromagnets and a separate damping electromagnet supplied from said source for supplying the remainder of the damping force, said separate damping electromagnet being supplied through a resonant circuit adjusted to operate on the ascending slope of its resonance curve for the purpose of compensating said meter for errors due to variations in frequency.

5. An integrating conductance meter of the induction type having a rotatively mounted armature, a voltage electromagnet and a current electromagnet which cooperates to drive said armature, said voltage electromagnet supplying approximately two-thirds of the damping force of said meter at normal frequency, a common source of alternating current susceptible to frequency variations for supplying said electromagnets, a separate damping magnet supplied from said source and supplying approximately one-third of the damping force of said meter at normal frequency, said separate damping electromagnet being supplied through a resonant circuit which is adjusted to operate on the ascending slope of its resonance curve over the range of frequency variation to which said source is susceptible.

6. The method of compensating an alternating current electric meter for errors due to variations in frequency of the source with which it is associated which consists in supplying similarly actuating forces of said meter through separate energizing circuits from the source, tuning one of said circuits so that the current flowing therein varies inversely with respect to the current in the other energizing circuit for variations in frequency and proportioning the similar acting forces of said meter supplied through said two circuits so that the sum of such forces remains substantially independent of frequency variations.

In witness whereof I have hereunto set my hand this fourteenth day of December, 1926.

WILLIAM H. PRATT.